United States Patent [19]

Phillips

[11] Patent Number: 4,690,359
[45] Date of Patent: Sep. 1, 1987

[54] TAKE-UP BRACKET FOR FLOORING ADJUSTMENT

[76] Inventor: Randall L. Phillips, 8004 Belleview, Kansas City, Mo. 64114

[21] Appl. No.: 858,383

[22] Filed: May 1, 1986

[51] Int. Cl.$^4$ ............................................. A47F 5/00
[52] U.S. Cl. .................................... 248/300; 52/285; 52/584; 248/220.1
[58] Field of Search ............................ 248/300, 220.1; 403/403, 205, 232.1; 52/584, 285

[56] References Cited

U.S. PATENT DOCUMENTS

| | | | |
|---|---|---|---|
| 1,380,518 | 6/1921 | Bellig | 248/220.1 X |
| 3,966,056 | 6/1976 | Larson | 248/220.1 X |
| 4,111,390 | 9/1978 | St. Jean | 248/220.1 X |
| 4,199,907 | 4/1980 | Bains et al. | 403/403 |
| 4,455,805 | 6/1984 | Rionda et al. | 403/232.1 X |
| 4,589,792 | 5/1986 | Niziol | 403/403 X |

*Primary Examiner*—Ramon O. Ramirez
*Attorney, Agent, or Firm*—Schmidt, Johnson, Hovey & Williams

[57] ABSTRACT

An adjustment bracket especially useful for adjusting the height of a floor or roof section relative to supporting floor joists or rafter is provided which serves to quickly and inexpensively correct for humps or dips in flooring base material or roof plywood caused by warpage in the material or sags in the joist. The bracket preferably is in the form of an elongated L-shaped body with a section-engaging leg integrally connected to a support-engaging leg. The section-engaging leg preferably includes a plurality of axially coincident, spaced apart, laterally centered slots and a pair of marginal, circular, laterally centered set holes. The support-engaging leg preferably includes a plurality of elongated, axially parallel, laterally centered slots whose axes form an oblique angle relative to the axis of the bracket. In use, the bracket is initially mounted adjacent to the juncture of a joist or rafter and the flooring or roof section to be adjusted; wood screws are placed in the slots adjacent the respective side thereof, and a punch is used to drive the bracket longitudinally; this longitudinal movement creates a camming action between the installed screws and the oblique slots which forcibly moves the section toward or away from the joist or rafter, depending upon initial screw placement. Nails or wood screws are then used in the set holes to permanently secure the section in its adjacent position.

4 Claims, 5 Drawing Figures

U.S. Patent  Sep. 1, 1987  4,690,359
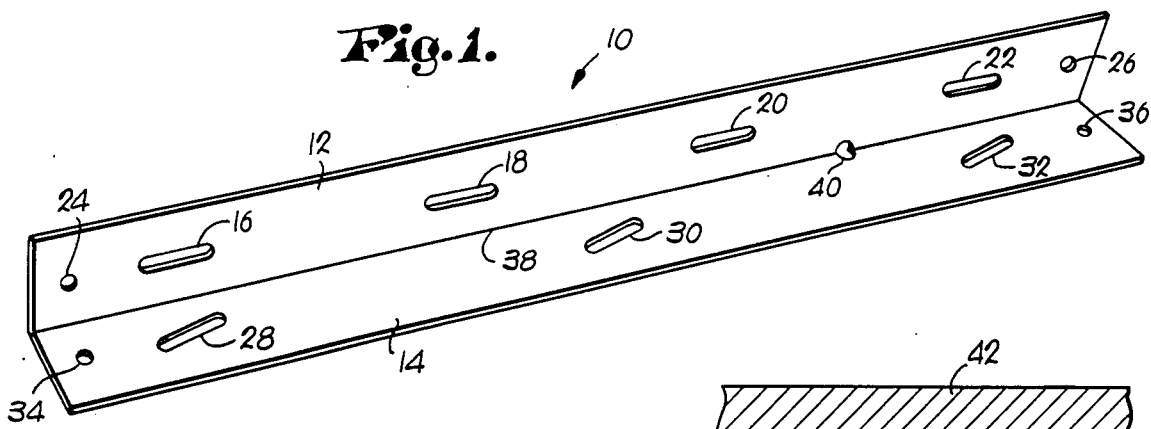
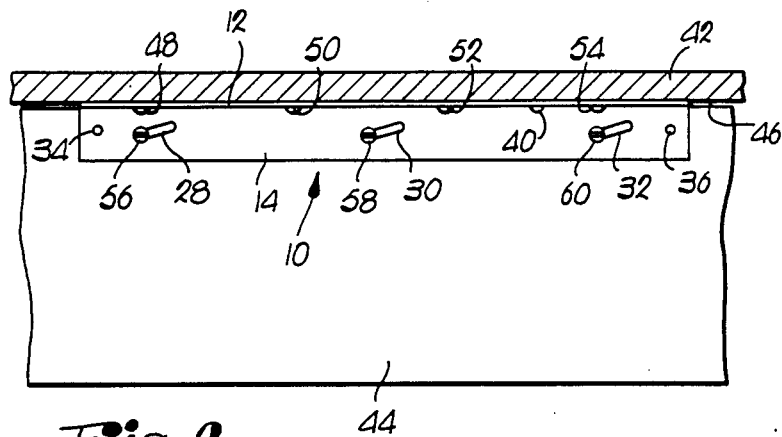
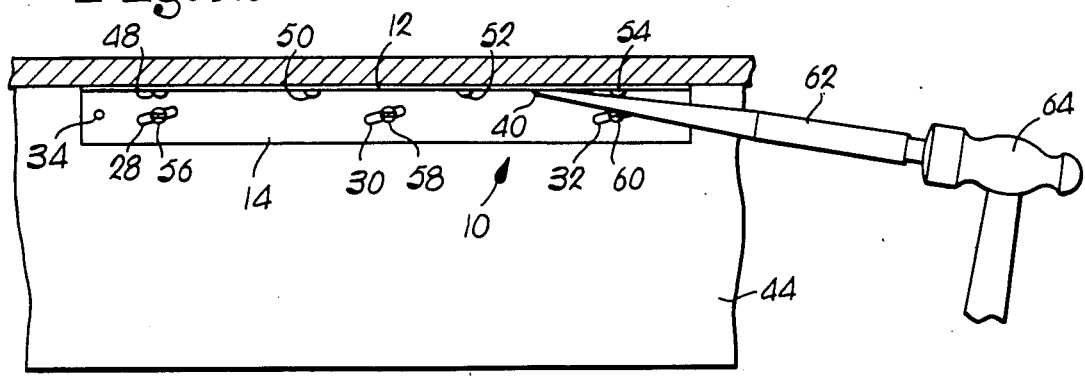

TAKE-UP BRACKET FOR FLOORING ADJUSTMENT

BACKGROUND OF THE INVENTION

1. Field of the Invention

This invention relates to a take-up bracket for connection between a flooring or roofing section and a supporting joist or rafter which is used to adjust the position of the floor or roof relative to the underlying support. More particularly, the invention is concerned with an elongated, L-shaped in cross-section, angle iron-type bracket presenting a flat, elongated first leg having a plurality of elongated slots therein whose axes are generally parallel to one another and to the longitudinal axis of the bracket, and an integral, flat, elongated second leg, substantially perpendicular to the first leg, having defined therein a plurality of elongated slots whose axes are generally parallel to one another but whose axes are an oblique angle relative to the bracket axis.

2. Description of the Prior Art

In new home construction, flat plywood sheets or other similarly functional material are nailed and/or glued to underlying, depending, perpendicular floor joists to form a flooring base. Typically, carpeting, tile, hardwood strips, and so forth are then applied to the plywood flooring base to form a finished floor.

The plywood subflooring used in this context may, because of modern-day standards in the lumber industry contain relatively high moisture levels above the eventual equilibrium level. Moreover, excess moisture is often present in such plywood flooring sheets by virtue of the fact that the sheets can absorb moisture during storage. When the home under construction is completed, the interior relative humidity of the air usually drops to a low level, especially in the winter. This low relative humidity condition causes the plywood sheets to dry out over time which may and often does cause the plywood sheets to warp or bulge and thereby raise up above the floor joists. The forces involved can cause the plywood to warp even though the sheets were initially firmly nailed and glued to the floor joists.

This warping may be so severe that "humps" in the finished floor are visually noticeable, and when a person walks across the floor, these humps then "give" and "squeak." Proper correction of this problem often involves great expense because the finished flooring material must be removed, the warped sheets renailed and reglued to the joists, and the finished flooring material replaced. Often the old carpet, tile and so forth cannot be salvaged and must be replaced anew.

This warping problem is not confined to new homes, but can occur in older homes as well when the old floor joists sag causing a "dip" in the floor usually in the vicinity of the center of the joist span. As the joist sags, the nails holding the plywood sheets may work loose or partially pull through the sheets, causing the floor to bounce and spring when one walks across the floor. Known solutions to this problem are expensive because, here again, the finished floor material must be removed, the flooring base shimmed up level at the junction with the joists, the flooring base renailed, and the new flooring material replaced.

The same problem can be encountered in roofing constructions, wherein the plywood sheeting can bow or "hump" relative to the supporting rafters. Prior methods of repair have involved removal of roof shingles, renailing of the roof sheeting, and shingle replacement. Here again, this is a costly and time-consuming repair.

SUMMARY OF THE INVENTION

The problems outlined above are solved by a bracket in accordance with the present invention. That is to say, the bracket hereof can be used to quickly and easily adjust a section of flooring or roofing to a new secure position relative to a floor joist or rafter support. This adjustment can be effected from a location under the floor or roof without the necessity and expense of removing and replacing the finished flooring or roofing shingles in order to renail the flooring base or roof sheeting from above.

Broadly speaking, a bracket in accordance with the present invention comprises an elongated, integral metallic body of generally L-shaped cross-section which includes an elongated, section-engaging leg having a plurality of first slots therein whose longitudinal axes are parallel to the longitudinal axis of the bracket, and a support-engaging leg including a plurality of elongated second slots therein, the axes of the second slots being generally parallel to one another but at an oblique angle relative to the longitudinal axis of the bracket.

Preferably, the longitudinal axes of the first slots are substantially coincident, and the bracket moreover includes a plurality of fastener-receiving set holes for securing the bracket in an operative position to the section and the support. In order to facilitate setting of the bracket, an additional aperture for receiving the end of a punch or the like used to forceably shift the bracket longitudinally. In particularly preferred forms, the longitudinal axes of the second slots in the support-engaging bracket leg lie at an angle of from about 10° to 30° relative to the longitudinal axis of the bracket.

BRIEF DESCRIPTION OF THE DRAWINGS

FIG. 1 is a perspective view of the preferred bracket in accordance with the present invention;

FIG. 2 is an elevational view of the preferred bracket shown connected to the flooring and a joist;

FIG. 3 is an end view of the bracket device of the invention initially attached installed to a bulging floor section and joist and prior to final installation of the bracket to eliminate the gap between the joist and floor section;

FIG. 4 is an elevational view of the preferred bracket during installation to a floor and joist wherein the bracket is being forced axially for floor adjustment purposes; and FIG. 5 is an end view similar to that of FIG. 3 but showing the finally installed bracket after a gap between the floor and joist has been eliminated.

DESCRIPTION OF THE PREFERRED EMBODIMENT

Referring now to the drawings, a preferred bracket 10 in accordance with the present invention is in the form of an elongated integral body composed of metal and having a generally L-shaped cross section (best seen in FIGS. 3, 5). The bracket broadly includes an elongated, flat, rectangular, first leg 12 and an elongated, flat, rectangular, second leg 14. First leg 12 includes spaced apart, axially coincident, laterally centered, slots 16, 18, 20, and 22 defined therein. First leg 12 also includes circular, laterally central, floor-set holes 24 and 26 defined therein.

Second leg 14 is generally dimensionally identical to first leg 12 and is integrally joined with leg 12 at substantially a right angle, thereby forming the L-shape of bracket 10. Second leg 14 includes a plurality of elongated, axially parallel, laterally centered, joist-adjacent slots 28, 30, 32 defined therein. Second leg 14 also includes circular, laterally centered, marginal set holes 34 and 36.

The juncture of legs 12 and 14 define a longitudinal axis 38 of bracket 10. The longitudinal axes of slots 28–32 are obliquely oriented relative to axis 38, and preferably lie at an angle of about 15° relative to such axis.

The juncture of legs 12 and 14 includes driving-tool receiving hole 40 which is adapted to receive the tip of an elongated driving tool such as a punch. Hole 40 is centered about axis 38 approximately equally on legs 12 and 14.

FIGS. 2–5 present respective complementary views of bracket 10 initially mounted to floor 42 and joist 44 with a gap 46 therebetween (FIGS. 2–3) during bracket adjustment (FIG. 4), and finally installed to eliminate the gap (FIG. 5). Bracket 10 is situated closely adjacent the juncture of floor 40 and joist 42 as illustrated. In the initial installation step, wood screws 48, 50, 52 and 54 are employed to secure leg 12 to floor 42 through slots 16–22. As depicted, the screws 46–52 are initially placed adjacent the leftmost sides of slots 16–22 and are screwed into floor 42 so that leg 12 is held snugly but not tightly against floor 42.

Wood screws 56, 58, and 60 are used to similarly affix leg 14 snugly but not tightly against joist 44. Again, the screws 56–60 are placed adjacent the lefthand side of slots 28–32 as viewed in FIG. 2.

Referring now to FIGS. 4 and 5, the tip of punch 62 is next placed into hole 40 at an appropriate angle (e.g., about 20°) relative to both floor 40 and joist 42. Hammer 64 is then used to pound on the end of punch 62 remote from receiving hole 40. The force exerted by hammer 64 on punch 62 is translated into leftward lateral movement of bracket 10. As bracket 10 moves leftwardly (FIG. 4) the sliding motion of angled slots 28–32 relative to screws 56–60 causes bracket 10 to move forcibly downwardly to likewise pull or cam floor 42 downwardly toward joist 44 and thereby close gap 46. Nails or wood screws are then inserted through set holes 24, 26 and 34, 36 to "set" bracket 10 permanently in place which prevents any further relative movement between bracket 10 and floor 40 or joist 42. Screws 48–60 are then tightly screwed in place. The use of bracket 10 as described above completely eliminates gap 46 between floor 42 and joist 44 thus avoiding the necessity and expense of removing finished flooring material from the top of floor 42 in order to hammer nails through floor 42 and joist 44 to eliminate gap 46.

Bracket 10 can also be used to raise floor 42 above joist 44 to create a gap by basically reversing the steps described above. Creation of a gap may be desirable if joist 44 near the center of its span had sagged thereby causing a "dip" in floor 42. If this condition exists, bracket 10 is placed into position with leg 12 adjacent floor 42 and leg 14 adjacent joist 44 as in FIG. 2, but with screws 48–60 located adjacent the righthand end of slots 16–22 and slots 28–32 respectively. Punch 62 is then oriented for hammering so that bracket 10 moves rightwardly. This rightward motion causes slots 28–32 to ride over screws 56–60 and thereby forcibly lift or cam bracket 10 upwardly. This motion can be continued until floor 40 is level, thereby eliminating the "dip." Nails or wood screws can then be inserted in set holes 24, 26 and 34, 36 to hold this new relative position between floor 42 and joist 44. Shimming wedges or the like can then be pounded into the newly created gap to hold floor level and firmly in place.

As indicated, the bracket 10 can also be used in the context of roof repairs where roof sheeting may warp and bulge relative to supporting rafters. The method of use in this context is identical with that described above in connection with flooring repairs.

Those skilled in the art will appreciate that the preferred embodiment shown herein is but illustrative of many embodiments contemplated by the present invention. For example, bracket 10 can be made longer or shorter, legs 12, 14 can be made wider or narrower, and additional or fewer slots can be included. Skilled artisans will also appreciate that the angle of the longitudinal axes of slots 28–32 of 15° relative to bracket axis 38 can be changed over a wide range as a matter of design choice; the present invention even comtemplates joist-adjacent slots being of varying angles relative to bracket axis 38 to add versatility in the use of bracket 10.

Having thus described the preferred embodiment of the present invention, what is claimed as new and desired to be secured by Letters Patent is:

1. An adjustment bracket adapted for operative connection to a supporting joist or rafter and an overlying supported section in order to move the supported section towards or away from the joist or rafter as desired, said bracket comprising:

an elongated, integral metallic body of generally L-shaped cross section and presenting a longitudinal axis, said body including an elongated section-engaging leg and an elongated support-engaging leg, said section-engaging leg including structure defining a plurality of elongated first slots therein each being of substantially constant width throughout essentially the entire length thereof, said first slots each having a longitudinal axis, the longitudinal axes of said first slots being substantially parallel with the longitudinal axis of said bracket, said support-engaging leg also including structure defining a plurality of elongated second slots therein each being of substantially constant width throughout substantially the entire length thereof, said second slots each having a longitudinal axis, said second slot axes being substantially parallel with each other and oriented at an angle of from about 10 to 30 degrees relative to the longitudinal axis of said bracket, said first and second slots being configured and arranged for receiving therethrough screws or other fasteners affixed to said joist or rafter and said section, and for permitting selective axial shifting of the bracket in either axial direction whereby to alternately draw the section closer to, or move the section away from, said joist or rafter; and structure defining at least one fastener-receiving set hole through each of said legs and separate from said slots for securing said bracket in operative disposition in engagement with said section and support after said shifting of said bracket.

2. The bracket as set forth in claim 1, the longitudinal axes of said first slots being substantially coincident.

3. The bracket as set forth in claim 1, including structure defining an aperture for receiving the end of a punch, whereby said bracket can be forcibly shifted longitudinally in either of said axial directions during installation thereof.

4. The bracket as set forth in claim 1, said angle being about 15°.

* * * * *